US008614885B2

(12) United States Patent
Solomon et al.

(10) Patent No.: US 8,614,885 B2
(45) Date of Patent: Dec. 24, 2013

(54) APPARATUS FOR STORING A STRUCTURE WITHIN AN ELECTRONIC DEVICE

(75) Inventors: Mark Solomon, Cypress, TX (US); Earl Moore, Cypress, TX (US); Jonathan R. Harris, Cypress, TX (US); Paul J. Doczy, Cypress, TX (US); Ronnie Anderson, Spring, TX (US); Brett Faulk, Cypress, TX (US); L. Joy Griebenow, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 155 days.

(21) Appl. No.: 13/237,403

(22) Filed: Sep. 20, 2011

(65) Prior Publication Data

US 2012/0062177 A1 Mar. 15, 2012

Related U.S. Application Data

(62) Division of application No. 10/903,106, filed on Jul. 30, 2004, now abandoned.

(51) Int. Cl.
*G06F 1/16* (2006.01)

(52) U.S. Cl.
USPC ................ 361/679.41; 361/679.26; 439/188; 312/223.1; 312/223.2

(58) Field of Classification Search
None
See application file for complete search history.

(56) References Cited

U.S. PATENT DOCUMENTS 4,788,658 A 11/1988 Hanebuth
5,020,926 A 6/1991 Wilhelm
5,080,452 A 1/1992 Tuckman
5,689,654 A 11/1997 Kikinis et al.
5,850,296 A 12/1998 Wang et al.
6,007,195 A 12/1999 Kokubo
6,035,350 A * 3/2000 Swamy et al. ................. 710/73
6,049,453 A 4/2000 Hulsebosch
6,065,080 A 5/2000 Alpert
6,184,652 B1 2/2001 Yang
6,219,037 B1 4/2001 Lee
6,359,775 B1 3/2002 Revis
6,362,610 B1 3/2002 Yang (Continued)

FOREIGN PATENT DOCUMENTS

DE 10128515 A1 8/2002
EP 1146621 A2 10/2001

(Continued)

OTHER PUBLICATIONS http://www.teleadapt.com/images_special/minimouse_slimhub.1.pdf.

(Continued)

*Primary Examiner* — Anthony Q Edwards

(57) ABSTRACT

An apparatus is disclosed that is adapted to reside in a bay of an electronic device having an interface adapted to engage a suitable structure. In an embodiment, the apparatus lacks the suitable connector to engage the device bay interface. Alternatively, the apparatus is adapted to reside in the bay of the electronic device and is configured to couple to only a portion of an electrical interface in the device bay such that the apparatus is charged when it resides in the device bay. In an additional embodiment, a game controller comprises first and second portions comprising respective interfaces and a hinge configured to enable the portions to move with respect to one another.

20 Claims, 8 Drawing Sheets

(56) References Cited

U.S. PATENT DOCUMENTS

| | | | | |
|---|---|---|---|---|
| 6,489,932 | B1 | 12/2002 | Chitturi et al. | |
| 6,665,741 | B1 * | 12/2003 | Bronson | 710/8 |
| 6,785,580 | B2 * | 8/2004 | Huang | 700/83 |
| 6,940,487 | B2 | 9/2005 | Matsunaga | |
| 7,221,961 | B1 * | 5/2007 | Fukumoto et al. | 455/557 |
| 2002/0039245 | A1 | 4/2002 | Hong et al. | |
| 2002/0050807 | A1 * | 5/2002 | Janik | 320/137 |
| 2002/0163777 | A1 | 11/2002 | Yu et al. | |
| 2003/0051089 | A1 | 3/2003 | Liu et al. | |
| 2003/0103035 | A1 | 6/2003 | Watanabe et al. | |
| 2004/0140955 | A1 | 7/2004 | Metz | |
| 2004/0263471 | A1 * | 12/2004 | Hsieh | 345/156 |
| 2004/0263493 | A1 | 12/2004 | Yueh | |

FOREIGN PATENT DOCUMENTS

| | | | |
|---|---|---|---|
| GB | 2376818 | A | 12/2002 |
| JP | 2000049914 | A | 2/2000 |
| JP | 2002315207 | A | 10/2002 |
| TW | 568312 | | 12/2003 |
| TW | 595775 | | 6/2004 |
| TW | M242791 | | 9/2004 |

OTHER PUBLICATIONS http://www.usb-port.com/uh254.html.

Examination Report for Application No. GB0514799.6 dated Feb. 29, 2008.

Decision of Refusal; Patent Application No. 2005-209605; drafting date Feb. 14, 2008.

* cited by examiner

APPARATUS FOR STORING A STRUCTURE WITHIN AN ELECTRONIC DEVICE

This application is a divisional application of U.S. patent application Ser. No. 10/903,106, filed on Jul. 30, 2004 now abandoned, which is hereby incorporated by reference in its entirety.

BACKGROUND

As computers and other electronic devices have advanced, the types of functions they are capable of performing has also evolved. For example, as portable and handheld computers have increased in processor power, screen resolution, and screen size, they have become capable of functioning as multimedia platforms that may be used to play music, movies, or games. Similarly, digital cameras and camcorders may store video files which, when the device is connected to a television, monitor, or computer, may be played by the device. In the same way, music players and other audio playback devices may be used to play stored audio files on a connected computer or stereo system.

To the extent that a user may use these types of devices to perform functions such as playing games, watching video, or listening to music, it may be desirable to provide the type of functionality or interface to users that they normally associate with these activities. For example, a user may prefer a gaming experience using a game controller or interface similar to that employed when using a dedicated gaming console. Similarly, a user watching video or listening to music stored on a portable electronic device may desire to use a familiar remote control or interface.

However, to the extent that portable and handheld computers, as well as other types of portable electronic devices, are designed to be easily and conveniently transported, it is inconvenient to carry separate equipment, such as controllers, cables, connectors, and so forth, with the device. Similarly, to the extent that the portable electronic devices may use insertable memory media, such as memory cards or sticks, it may be undesirable to carry additional, loose media with the device.

DETAILED DESCRIPTION

As discussed below, certain embodiments of the present invention comprise a technique for storing auxiliary equipment for use with an electronic device, such as a portable or handheld computer, a personal digital assistant (PDA), a digital camera or camcorder, an audio player (such a player configured to play files in accordance with a Motion Picture Experts Group, Audio Layer 3 (MP3) standard), or other consumer electronic device. The teachings of the present invention take advantage of user-accessible peripheral or memory device bay(s) in the housing of the electronic device that are configured to interface with insertable components or media, such as peripheral cards, storage devices, or memory cards. For example, a device bay, as discussed herein, may comprise one or more peripheral card slots, such as slots configures to receive peripheral cards adhering to a Personal Computer Memory Card International Association (PCMCIA) standard or an express card standard. Similarly, a device bay may comprise slots adapted to engage and read various media, such as optical disks, magnetic disks, memory cards, or other memory media. Furthermore, a device bay may comprise a bay or compartment configured to accommodate a storage device or reader, such as optical and floppy disk drives or removable hard drives. According to the teachings of the present invention, such a device bay, when not occupied by the peripheral device, memory media, storage device, etc. for which it is configured, may instead be used to securely store other structures or equipment.

Figure 1:
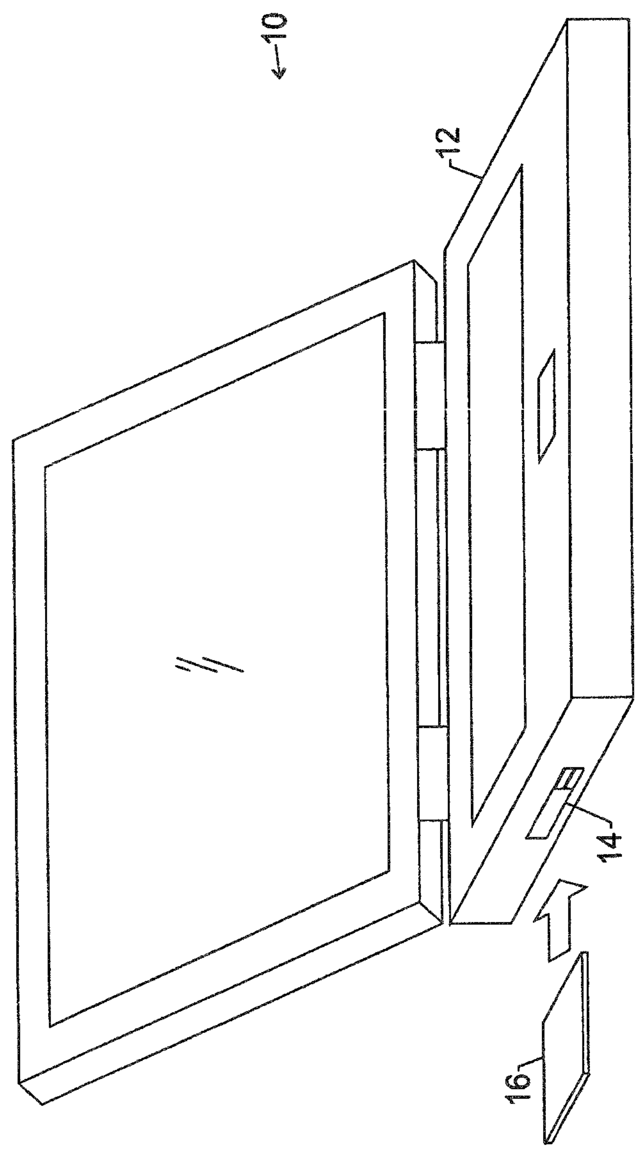
FIG. 1 depicts an embodiment of a portable computer and an insertable structure, in accordance with aspects of the present invention.

Turning to the figures, FIG. 1 depicts an embodiment of an electronic device in the form of a portable computer 10, such as a laptop, notebook, or tablet computer. The housing 12 of the portable computer 10 includes a variety of device bays configured to receive removable components or media designed operate within the bay. For example, a device bay may be configured to directly connect to a suitably configured device, such as by an electrical interface, when the device is inserted into the bay. When so connected, the inserted device may operate with other components with which it is electrically connected, such as with a bus, memory, or processor in the interior of the portable computer 10. For example, the housing 12 includes one or more peripheral card slots 14, such as PCMCIA or express card slots, that are configured to electrically interface/connect with a peripheral card, such as a network adapter, modem, or removable hard drive. As will be appreciated, peripheral cards of this type are generally designed to provide increased functionality to the portable computer 10 when inserted into a respective bay or slot such that they properly interface with a respective electrical connector when inserted into the bay. However, many structures such as, and without limitation, electronic apparatuses, storage containers, chargeable structures, etc., lack a suitable connector to directly connect to the bay's interface, although they may interact with the electronic device via other communication avenues, e.g., wireless, a separate cable to connect to a dedicated outlet in the device housing, etc.

When the functionality provided by a peripheral card or other removable device is not needed, the corresponding bay, such as the depicted peripheral card slots 14, may be vacant. In such circumstances, the vacant bay is utilized, in accordance with embodiments of the present invention, to securely store other equipment or devices, such as the structure 16, which are designed to be used remote from or outside of the bay. In particular, when not in use, the structure 16 is configured to reside in a bay, where residing is defined to encompass being retained in, fitting within, or being positionable entirely or mostly within the confines of the bay. When a user wishes to remove a structure 16 residing in a bay, the structure 16 is ejected using the ejection mechanism typically used to remove the peripheral card or other removable device for which the slot or bay is configured. Alternately, in other embodiments, the user simply pulls on the structure 16 with sufficient force to overcome the resistive or engaging force holding the structure 16 within the bay, such as the peripheral card slot 14.

In one implementation, the structure 16 is an electronic apparatus, such as a universal serial bus (USB) hub or an input device or a control device, that communicates with or connects to the portable computer 10, but not via the connectors present within the slot or bay in which it is stored. For example, the structure 16 may be a controller or other input device which, when not stored within the bay, may communicate, without limitation, with the portable computer 10 via wireless means, such as over the infrared or radio frequencies, or via a cable connection to a dedicated interface in the housing of portable computer 10. Examples of some electronic apparatuses would be a remote control, a game controller, and optical and non-optical mice.

In another embodiment, the structure 16 connects to the connector(s) within a respective bay, here depicted as peripheral card slots 14, in a limited manner, such as to charge a battery of structure 16. In one exemplary embodiment, the limited connection between the structure 16 and the connector(s) enables power, but not data, to pass between the structure 16 and portable computer 10 or other electronic device. In this manner, a chargeable component of the structure 16, such as a battery, may charge from a battery of the portable computer 10 or from power delivered to the portable computer 10, such as via an AC power cord plugged into an electrical outlet. In such an embodiment, the structure 16 is charged when not in use, i.e., when stored in a device bay, so that the charged structure 16 is ready for use (i.e., its intended functionalities) when removed from the bay. For example, the controller or input device of the preceding example may include a chargeable battery that is charged when stored in the bay via a limited or dedicated connection to an electrical interface within the depicted peripheral card slots 14. In such a limited interface, no communicative connection exists between the structure 16 and the portable computer 10 or other electronic device.

While the structure 16 may be an electronic device, as set forth in the preceding examples, it may also be a simple mechanical structure, such as a storage container. In such an embodiment, the structure 16 may be used to store any item capable of fitting into the structure 16. For instance, equipment for use with the portable computer 10 or with other electronic devices may be stored in this manner. For example, a storage structure may be used to store a variety of memory media which may be read by the portable computer 10 or by another electronic device. Examples of such storable memory media include memory sticks, memory cards, including secure digital (SD) memory cards, multimedia cards (MMC), mini-optical disks, and so forth. Similarly, cable, such as network, telephone, or USB cable usable with the portable computer 10 or with other electronic devices, may be stored in a suitable structure 16. However, items unrelated to the use of the portable computer 10, such as paper clips, rubber bands, gum, and so forth, may also be stored in this manner so that a user may store and carry other items, even if not related to the use of the electronic device.

Figure 2:
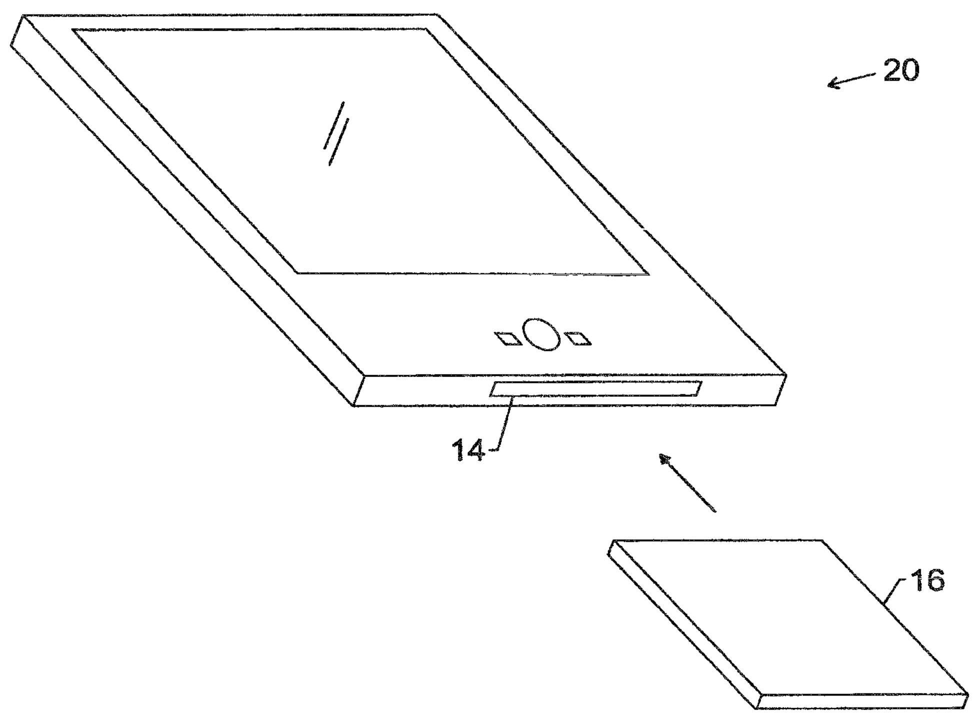
FIG. 2 depicts an embodiment of a handheld computer and an insertable structure, in accordance with aspects of the present invention.

While the portable computer 10 depicted in FIG. 1 is one example of an electronic device that may benefit from the teachings of the present invention, other electronic devices which have at least one device bay, such as peripheral or memory card slots, can also benefit. For example, referring now to FIG. 2, a portable electronic device, such as a PDA or handheld computer 20, is depicted. The portable electronic device includes a user-accessible device bay, such as a memory card slot or a peripheral card slot 14, which may be used for storage when slot 14 is vacant. Similarly, other electronic devices, such as MP3 and other audio players, digital cameras and camcorders, portable digital video disk (DVD) players, and so forth, may include compartments or bays for the insertion of functional components or memory media which, when empty, may be used to store other equipment or media for use with the device or another electronic device.

The following discussion provides examples of different structures 16 which may exemplify or expand upon some of the concepts discussed above. For the purpose of illustration, the following examples will be discussed in the context of storage within peripheral card slots, particularly PCMCIA card slots. However, in view of the preceding discussion, one of ordinary skill in the art will appreciate that other device bays are also contemplated for storing devices and structures in accordance with the teachings of the present invention and that the following examples are merely illustrative.

Figure 3:
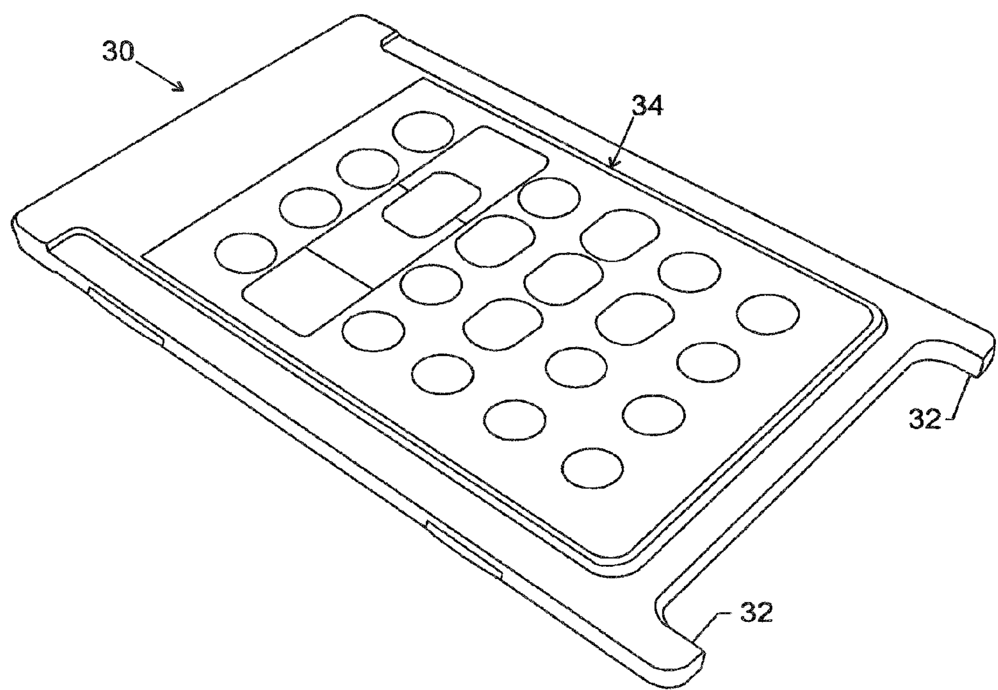
FIG. 3 depicts an embodiment of a remote control device configured to be inserted into a peripheral card slot of an electronic device, in accordance with aspects of the present invention.

For example, referring now to FIG. 3, a remote control 30 is depicted that is configured to be inserted and securely held within a PCMCIA card slot, such as may be found on a portable or handheld computer. In particular, the remote control 30 includes spacers 32 which prevent the remote control 30 from contacting the electrical connectors located in a PCMCIA card slot. In this way, the connectors within the PCMCIA card slot are not damaged by insertion and storage of the remote control 30 into the slot. Furthermore, in one embodiment, the spacers 32 enable an ejection mechanism found within a PCMCIA card slot to eject the remote control 30 when the ejection mechanism is actuated.

In one embodiment, the remote control 30 of FIG. 3 runs on a battery and does not contact the connectors located within a device bay, e.g., a PCMCIA card slot. In another embodiment, however, the remote control 30 may include receptacles or contacts on the spacers 32 which contact respective power connectors at the end of the bay to enable recharging of a battery of the remote control. In this embodiment, the spacers 32 enable the remote control 30 to be charged when stored in a bay but prevent the remote control 30 from contacting other interface structures within the bay.

Figure 4:
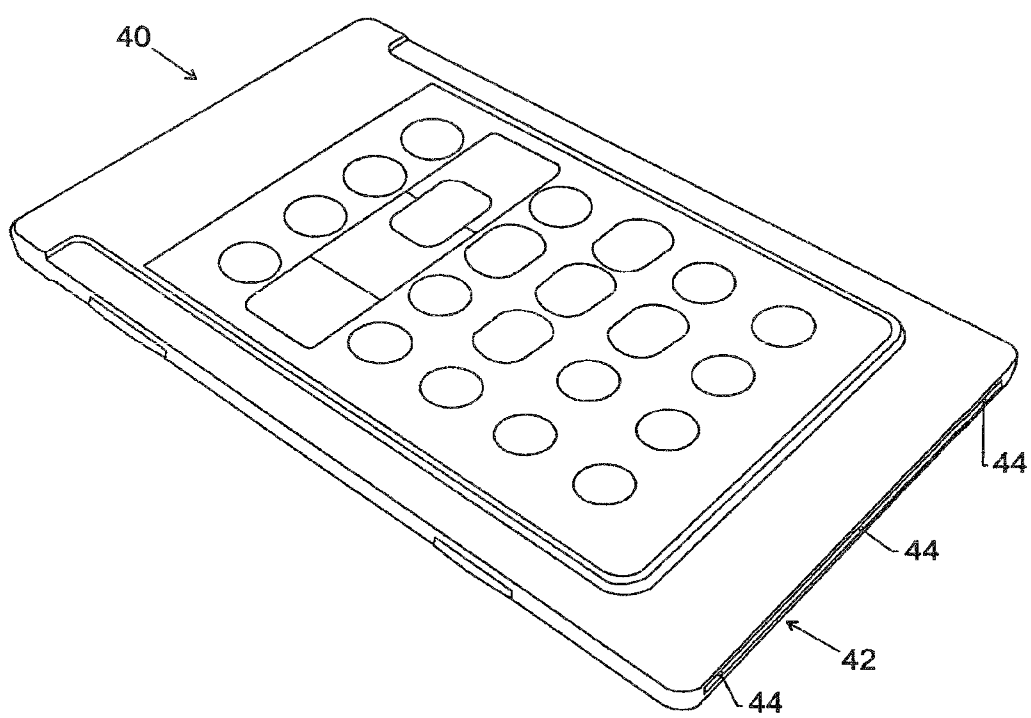
FIG. 4 depicts an embodiment of a remote control device configured to be inserted into a peripheral card slot of an electronic device and to be charged within the slot, in accordance with aspects of the present invention.

Similarly, referring now to FIG. 4, an alternative embodiment of a chargeable remote control 40 is provided. As in the preceding embodiment, in this embodiment the chargeable remote control 40 is configured to be charged when stored within a device bay, e.g., a PCMCIA card slot. In particular, the chargeable remote control 40 includes all or part of a charging interface 42 for coupling with connectors within a peripheral card slot. In the depicted embodiment, the charging interface 42 does not include a full complement of receptacles or contacts for engaging the full set of available connectors 46 (depicted in FIG. 5) of the peripheral card slot 14. Instead, the charging interface 42 is configured to connect to some or all of the power pins 48 of the complementary peripheral card slot interface. In the depicted example, the chargeable remote control 40 includes power pin receptacles 44 corresponding to the power pins of a peripheral card slot, that is, for example, pins 1, 17, 34, 35, 51, and 68 of a PCMCIA card slot. In this way, a battery or other chargeable medium within the chargeable remote control 40 may be charged when control 40 is not in use and while stored in a peripheral card slot or other bay.

Figure 5:
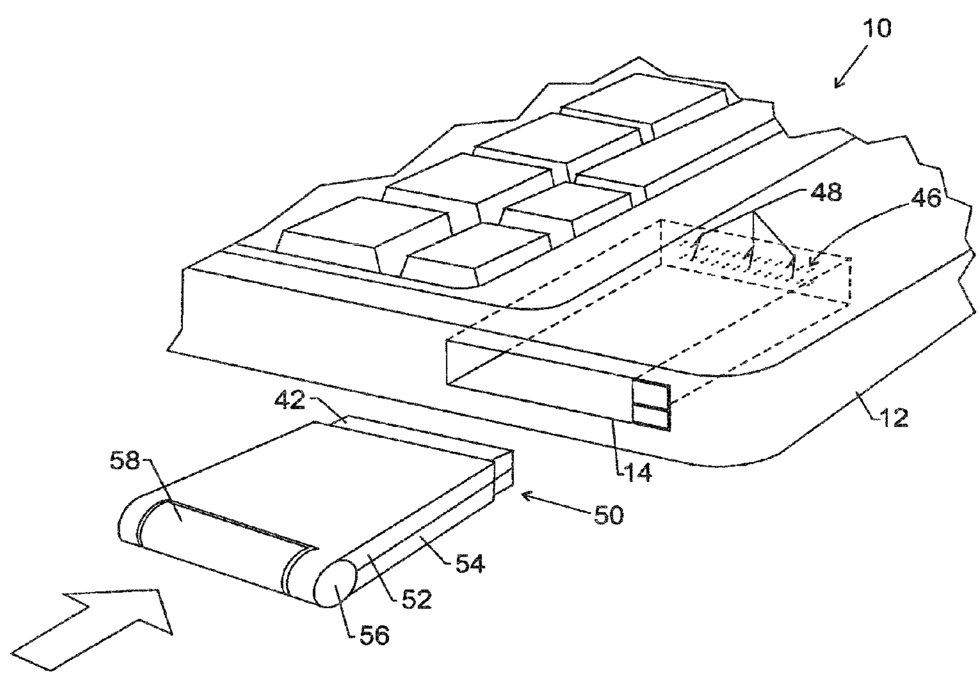
FIG. 5 depicts an embodiment of a foldable game controller configured to be inserted into a peripheral card slot of an electronic device, in accordance with aspects of the present invention.
Figure 6:
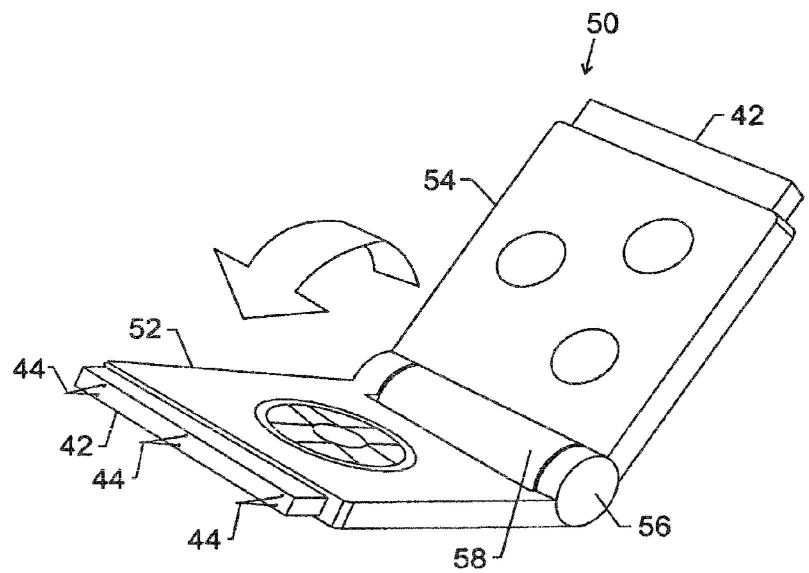
FIG. 6 depicts the foldable game controller of FIG. 5 being unfolded, in accordance with aspects of the present invention.
Figure 7:
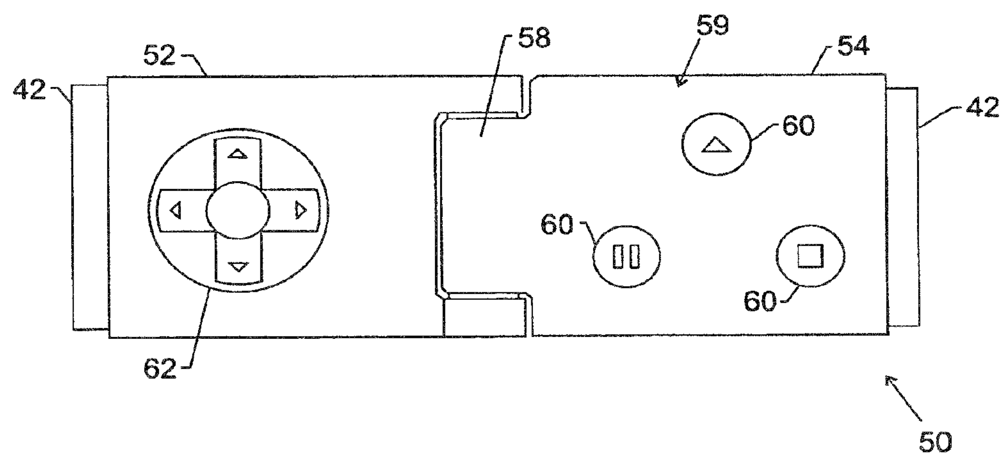
FIG. 7 depicts the foldable game controller of FIG. 5 when unfolded, in accordance with aspects of the present invention.

While remote controls represent one type of electronic apparatus that may be stored within a peripheral card slot or other bay of a portable electronic device, other devices, such as USB hubs or other types of controllers, may also be stored in this manner. For example, referring now to FIG. 5, a foldable game controller 50 is depicted. The depicted game controller comprises a first portion 52 and a second portion 54 connected by a hinge 56. When the two portions 52 and 54 are folded into a closed position, as depicted in FIG. 5, the game controller 50 is insertable into a pair of vacant peripheral card slots 14. When removed from the peripheral card slots 14 the two portions 52 and 54 of the game controller 50 may be unfolded to an open position, as depicted in FIG. 6, to reveal a game control interface 59, as depicted in FIG. 7. In the depicted embodiment, the game control interface 59 includes action and pause buttons 60 and a directional control 62, such as a joystick interface. The depicted game controller 50 communicates with a suitable gaming device, such as a portable or handheld computer, via wireless means. In this embodiment, the game controller 50 includes a compartment, such as hinge compartment 58, within which a battery is inserted to power the game controller 50. In the depicted embodiment, one or more charging interfaces 42, such as discussed above in connection with FIG. 4, are provided to charge the battery of game controller 50 when stored in the peripheral card slots 14. In particular, the power pin receptacles 44 of the charging interface 42 engage some or all of the respective power pins 48 of the available connectors 46. In other embodiments, the charging interfaces 42 may be absent and the battery is replaced by the user as needed instead of being charged when stored in a respective bay.

Figure 8:
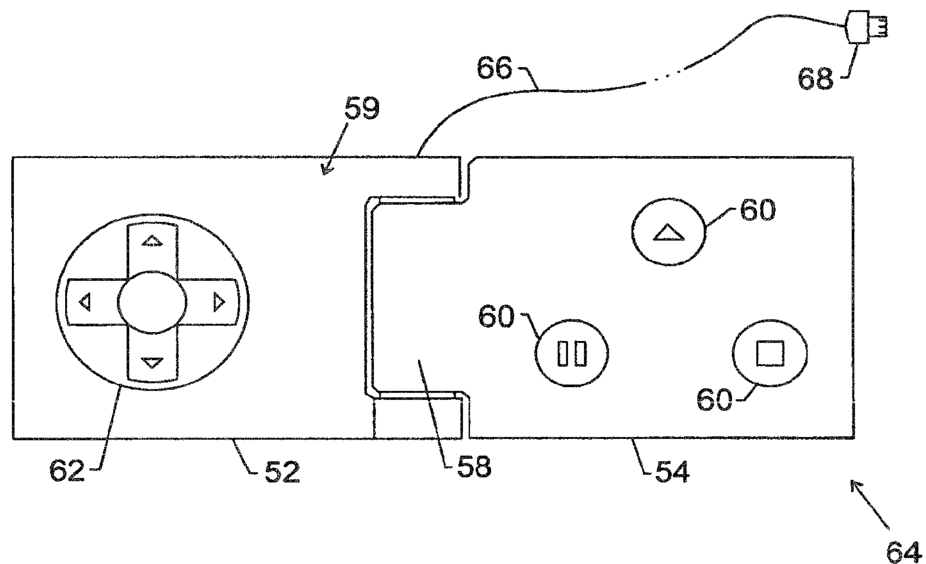
FIG. 8 depicts an alternate embodiment of a game controller including a storable cable, in accordance with aspects of the present invention.

Alternatively, in another embodiment, a cable-connected game controller 64 is provided, as depicted in FIG. 8. In this embodiment, a cable 66 and connector 68, such as a USB connector, may be stored in the hinge compartment 58. In the depicted embodiment, the cable-connected game controller 64 is powered through the cable 66 when the connector 68 is inserted into a complementary receptacle of a gaming device, such as a portable or handheld computer. In other embodiments, the cable-connected game controller 64 may be battery-powered and/or chargeable, as described above. Elsewise, it will be appreciated by one skilled in the art that cable 66 and connector 68 does not have to be stored in hinge compartment 58 but may instead be stored as desired within the game controller 64.

Figure 9:
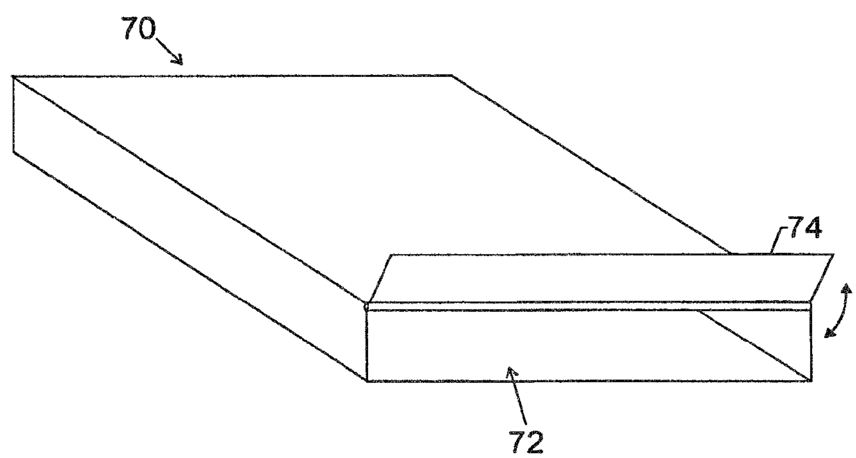
FIG. 9 depicts an embodiment of a storage structure configured to be inserted into a peripheral card slot of an electronic device, in accordance with aspects of the present invention.

While controllers and other input devices represent one type of apparatus which may be inserted for storage within a bay of an electronic device, other types of devices and/or structures may also stored in this manner. For example, a storage structure 70 configured to be stored in a slot or bay of an electronic device is depicted in FIG. 9. The storage structure 70 encloses a storage space 72, which can be accessed by moving all or part of a movable section 74 of the storage structure housing. For example, in the depicted embodiment, a hinged movable section 74 of the storage structure housing is such that the movable section 74 may be flipped between open and closed positions. In other embodiments, the movable section 74 may be configured to slide between open and closed positions or may be configured to move in other ways known to those of ordinary skill in the art.

The accessible storage space 72 may be used to store media, such as memory cards or memory sticks, for use with a reader of the electronic device or another electronic device. Though the storage of memory media is one possibility, in practice, any item or items of interest capable of fitting into the storage structure 70 may be stored by a user. For example, replacement parts, such as screws, nuts, bolts, etc., for equipment may be stored in the storage space 72. Similarly, office supplies, such as paper clips, rubber bands, adhesive flags, and so forth, may be stored in the storage space 72 if a user so desires.

Figure 10:
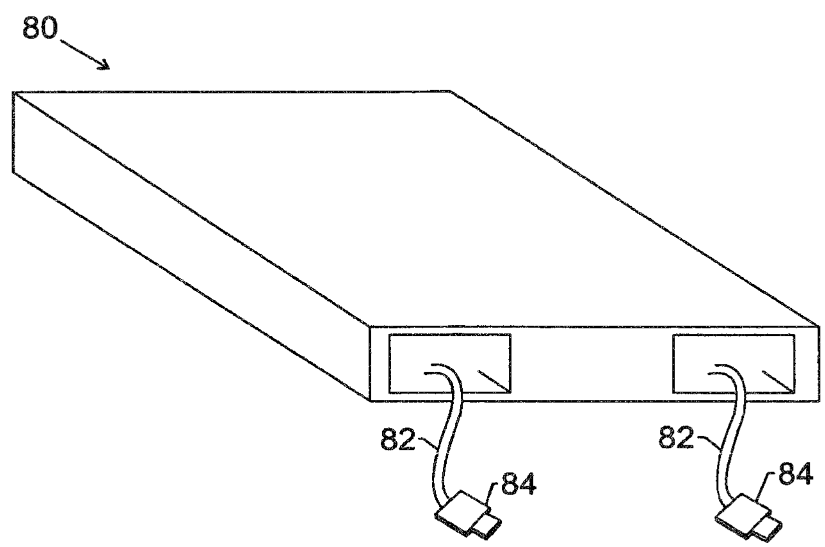
FIG. 10 depicts an embodiment of a cable storage structure configured to be inserted into a peripheral card slot of an electronic device, in accordance with aspects of the present invention.
Figure 11:
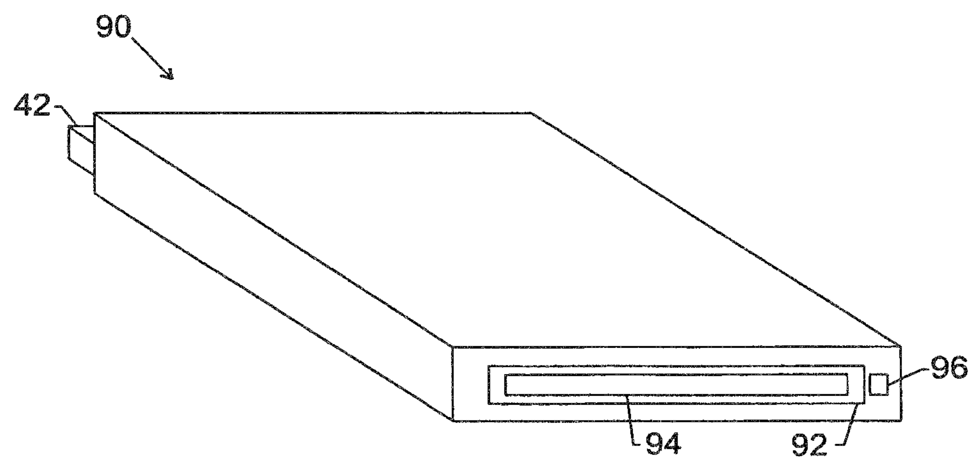
FIG. 11 depicts an embodiment of a battery charging structure configured to be inserted into a peripheral card slot of an electronic device, in accordance with aspects of the present invention.

Likewise, in one embodiment depicted in FIG. 10, a cable storage structure 80 is provided which is configured to be stored in a slot or bay of an electronic device. The depicted cable storage structure 80 is configured to store at least one type of cable 82, such as network cable, telephone cable, USB cable, and so forth. When in use, the stored cable 82 is withdrawn from the cable storage structure 80 and used to connect respective sockets or plugs that the connectors 84 are configured to fit. In the depicted embodiment, the cable 82 is accessible when the cable storage structure 80 is stored in a slot or bay of an electronic device, though this need not be the case in all embodiments.

In an additional exemplary embodiment, a charging structure 90 is provided. The charging structure 90 includes a charging interface 42 that may be used to connect to some or all of the power pins of a peripheral card slot, such as a PCMCIA slot, or other power connectors in the bay into which the charging structure 90 is inserted. In the depicted embodiment, the charging structure 90 includes a battery receptacle 92 configured to receive one or more batteries 94 for charging. The depicted charging structure 90 also includes a battery ejection mechanism, which is activated by the ejection button 96, to facilitate the unloading of the battery 94 from the structure 90. In other embodiments, no ejection mechanism may be provided other than the force applied by a user to overcome a resistive force holding the battery 94 in the charging structure 90.

While the preceding examples provide some idea of the scope and variety of storable structures encompassed by the present technique, it is too be understood that these examples are merely illustrative and are not intended to exclusively list the range of possibilities. Indeed, one of ordinary skill in the art will appreciate that other storable structures encompassing other functionalities than those presently described are within the scope of the present disclosure.

What is claimed is:

1. An apparatus, comprising:

a chargeable structure configured to be stored in a bay of an electronic device when not in use in connection with the electronic device, the chargeable structure having a limited charging interface that enables, when stored in the bay, the chargeable structure to connect to less than all of an entirety of connections within the bay such that the chargeable structure receives power and not data from the electronic device.

2. The apparatus of claim 1, wherein the chargeable structure is configured to wirelessly exchange data with the electronic device when in use.

3. The apparatus of claim 1, wherein the chargeable structure is configured to receive power from the electronic device through at least two power pins in the bay.

4. The apparatus of claim 3, wherein the chargeable structure comprises a foldable game controller.

5. The apparatus of claim 1, wherein the foldable game controller is configured to be stored in two adjacent bays.

6. The apparatus of claim 1, wherein the chargeable structure comprises a remote control.

7. The apparatus of claim 1, wherein the chargeable structure comprises an input device for the electronic device.

8. The apparatus of claim 1, wherein the chargeable structure comprises a game controller.

9. The apparatus of claim 1, wherein the chargeable structure comprises an input device for the electronic device.

10. The apparatus of claim 1, wherein the chargeable structure comprises a battery.

11. A system comprising:

an electronic device including a bay to receive a chargeable structure; and the chargeable structure configured to be stored in the bay of the electronic device when not in use in connection with the electronic device, the chargeable structure having a limited charging interface that enables, when stored in the bay, the chargeable structure to connect to less than all of an entirety of connections within the bay such that the chargeable structure receives power and not data from the electronic device.

12. The system of claim 11, wherein the chargeable structure is configured to wirelessly exchange data with the electronic device when in use.

13. The system of claim 11, wherein the chargeable structure is configured to receive power from the electronic device through at least two power pins in the bay.

14. The system of claim 11, wherein the chargeable structure comprises a foldable game controller.

15. The system of claim 11, wherein the chargeable structure comprises a game controller.

16. The system of claim 11, wherein the chargeable structure comprises a remote control.

17. The system of claim 11, wherein the chargeable structure comprises a control device configured to function with the electronic device.

18. The system of claim 11, wherein the bay comprises at least one peripheral card slot.

19. The system of claim 11, wherein the chargeable structure comprises an input device for the electronic device.

20. The system of claim 11, wherein the chargeable structure comprises a battery.

* * * * *

UNITED STATES PATENT AND TRADEMARK OFFICE

CERTIFICATE OF CORRECTION

PATENT NO. : 8,614,885 B2
APPLICATION NO. : 13/237403
DATED : December 24, 2013
INVENTOR(S) : Mark Solomon et al.

It is certified that error appears in the above-identified patent and that said Letters Patent is hereby corrected as shown below:

In the Claims

In column 7, line 6, in Claim 5, delete “claim 1,” and insert -- claim 4, --, therefor.

Signed and Sealed this
Third Day of June, 2014

Michelle K. Lee

Michelle K. Lee
*Deputy Director of the United States Patent and Trademark Office*